United States Patent
Aycin et al.

(10) Patent No.: US 9,602,144 B2
(45) Date of Patent: Mar. 21, 2017

(54) METHOD AND APPARATUS FOR PROCESSING MULTIPLE WIRELESS COMMUNICATION SERVICES

(75) Inventors: Erica Ellyn Aycin, W. Babylon, NY (US); Gerard Klahn, Sayville, NY (US); Tanbir Haque, Long Island City, NY (US)

(73) Assignee: INTERDIGITAL TECHNOLOGY CORPORATION, Wilmington, DE (US)

(*) Notice: Subject to any disclaimer, the term of this patent is extended or adjusted under 35 U.S.C. 154(b) by 578 days.

(21) Appl. No.: 11/156,745

(22) Filed: Jun. 20, 2005

(65) Prior Publication Data

US 2006/0046773 A1    Mar. 2, 2006

Related U.S. Application Data

(60) Provisional application No. 60/604,582, filed on Aug. 26, 2004.

(51) Int. Cl.
*H03D 7/16* (2006.01)
*H04B 1/00* (2006.01)

(52) U.S. Cl.
CPC ......... *H04B 1/0057* (2013.01); *H04B 1/0071* (2013.01); *H04B 1/0085* (2013.01)

(58) Field of Classification Search
CPC ... H04B 1/0057; H04B 1/0071; H04B 1/0085
USPC ........ 455/203, 180.1, 188.1, 164.1, 70, 254, 455/131, 561, 553, 77, 81, 189, 557, 143, 455/84, 86, 142, 189.1, 74, 306, 550, 455/150.1, 179.1
See application file for complete search history.

(56) References Cited

U.S. PATENT DOCUMENTS

| | | | |
|---|---|---|---|
| 4,580,101 A | | 4/1986 | Lax |
| 5,287,558 A | | 2/1994 | Hansen |
| 5,649,321 A | * | 7/1997 | Kellenberger ................. 455/221 |
| 5,794,147 A | * | 8/1998 | Huang ................ H04L 27/0012 375/216 |
| 5,848,097 A | * | 12/1998 | Carney et al. ................. 375/219 |
| 5,861,826 A | | 1/1999 | Shu et al. |
| 5,881,369 A | * | 3/1999 | Dean ....................... H04B 1/005 455/266 |
| 5,995,815 A | * | 11/1999 | Blom ....................... H03J 5/244 455/143 |
| 6,014,571 A | * | 1/2000 | Enoki ..................... H04B 1/005 455/131 |

(Continued)

FOREIGN PATENT DOCUMENTS

| | | |
|---|---|---|
| EP | 0678974 A2 | 10/1995 |
| JP | 2001-274714 | 10/2001 |
| JP | 2004-357025 | 12/2004 |

*Primary Examiner* — Tan H Trinh
(74) *Attorney, Agent, or Firm* — Volpe and Koenig, P.C.

(57) ABSTRACT

The present invention is related to a method and apparatus for processing multiple wireless communication services in a receiver. A receiver receives more than one wireless communication service simultaneously via a wireless interface. Each service is transmitted via a different carrier frequency band. The multiple received carrier signals are down-converted to an intermediate frequency (IF) band using a mixer and a local oscillator (LO). The LO frequencies are set such that the down-converted IF bands of the multiple services are fallen into a single IF band.

6 Claims, 7 Drawing Sheets

(56) References Cited

U.S. PATENT DOCUMENTS

| | | | |
|---|---|---|---|
| 6,029,052 A * | 2/2000 | Isberg | H03J 5/244 455/131 |
| 6,112,065 A * | 8/2000 | Holden | H04B 1/28 455/207 |
| 6,112,069 A | 8/2000 | Na | |
| 6,374,094 B1 * | 4/2002 | Zappala | 455/188.1 |
| 6,433,531 B1 * | 8/2002 | Regev | 324/77.11 |
| 6,445,726 B1 * | 9/2002 | Gharpurey | 375/136 |
| 6,449,264 B1 * | 9/2002 | Lehtinen | H04B 1/0071 370/328 |
| 6,483,355 B1 * | 11/2002 | Lee et al. | 327/113 |
| 6,498,819 B1 * | 12/2002 | Martin | 375/345 |
| 6,608,998 B1 | 8/2003 | Neumann et al. | |
| 6,614,806 B1 * | 9/2003 | Nanni | 370/468 |
| 6,631,255 B1 | 10/2003 | Claxton et al. | |
| 6,735,421 B1 | 5/2004 | Claxton et al. | |
| 6,741,844 B2 * | 5/2004 | Medvid et al. | 455/232.1 |
| 6,741,847 B1 | 5/2004 | Claxton et al. | |
| 6,760,342 B1 | 7/2004 | Skones et al. | |
| 6,801,583 B1 * | 10/2004 | Claxton | H04B 1/0003 375/316 |
| 6,816,021 B2 * | 11/2004 | Hahn et al. | 331/74 |
| 6,856,925 B2 | 2/2005 | Muhammad et al. | |
| 7,068,171 B2 * | 6/2006 | Gardenfors et al. | 340/572.1 |
| 7,158,760 B1 * | 1/2007 | Baringer et al. | 455/76 |
| 7,565,170 B2 * | 7/2009 | Buscaglia et al. | 455/561 |
| 2003/0040292 A1 * | 2/2003 | Peterzell et al. | 455/147 |
| 2003/0103743 A1 * | 6/2003 | Sun | G02B 6/368 385/114 |
| 2003/0176177 A1 * | 9/2003 | Molnar | H03D 7/1425 455/323 |
| 2003/0193923 A1 * | 10/2003 | Abdelgany | H04B 1/005 370/342 |
| 2004/0110482 A1 * | 6/2004 | Chung | H04B 1/28 455/302 |
| 2004/0198440 A1 | 10/2004 | Soliman | |
| 2004/0219898 A1 * | 11/2004 | Bult | H03F 3/195 455/252.1 |
| 2007/0019758 A1 * | 1/2007 | Haque et al. | 375/316 |

\* cited by examiner

METHOD AND APPARATUS FOR PROCESSING MULTIPLE WIRELESS COMMUNICATION SERVICES

CROSS REFERENCE TO RELATED APPLICATION

This application claims the benefit of U.S. provisional application No. 60/604,582 filed Aug. 26, 2004, which is incorporated by reference as if fully set forth.

FIELD OF INVENTION

The present invention is related to wireless communication systems. More particularly, the present invention is related to a method and apparatus for processing multiple wireless communication services in a receiver.

BACKGROUND

Software defined radio (SDR) is a scheme in which multiple wireless communication standards are supported in a wireless transmit/receive unit (WTRU) and radio frequency (RF) signals are processed by software defined units. With SDR, a single hardware platform can support multiple wireless communication standards without replacing hardware components, and downloaded software can reconfigure the hardware. In this way, WTRUs can be rapidly configured to support newly developed wireless communication standards and protocols.

Currently, WTRUs are configured to process multiple services received through multiple channels. For example, a WTRU may support communications both in a digital cellular system (DCS) and a wideband code division multiple access (WCDMA) system. Each service is processed through a corresponding receiver path in the WTRU and separately input into a modem in the WTRU for processing. However, only one service is supported at a given time in each receiver path.

Current WTRU designs also include front-end configurations that involve a switch or a multiplexer and multiple filters that separate the signals into different receiver paths for the frequency band of each service. Each receiver path requires separate filters, a down-converter, a demodulator and local oscillators (LOs). Therefore, prior art WTRUs require extensive hardware resources to support multiple services and the configuration is not desirable in terms of battery life of the WTRU.

SUMMARY

The present invention is related to a method and apparatus for processing multiple wireless communication services in a receiver. In accordance with the present invention, more than one wireless communication service is received and processed simultaneously. The services are transmitted via different carrier frequency bands and the received carrier frequency bands are down-converted to an intermediate frequency (IF) band. Local oscillator (LO) frequencies are set such that the down-converted IF bands of the multiple services fall into a single IF band.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

Figure 1:
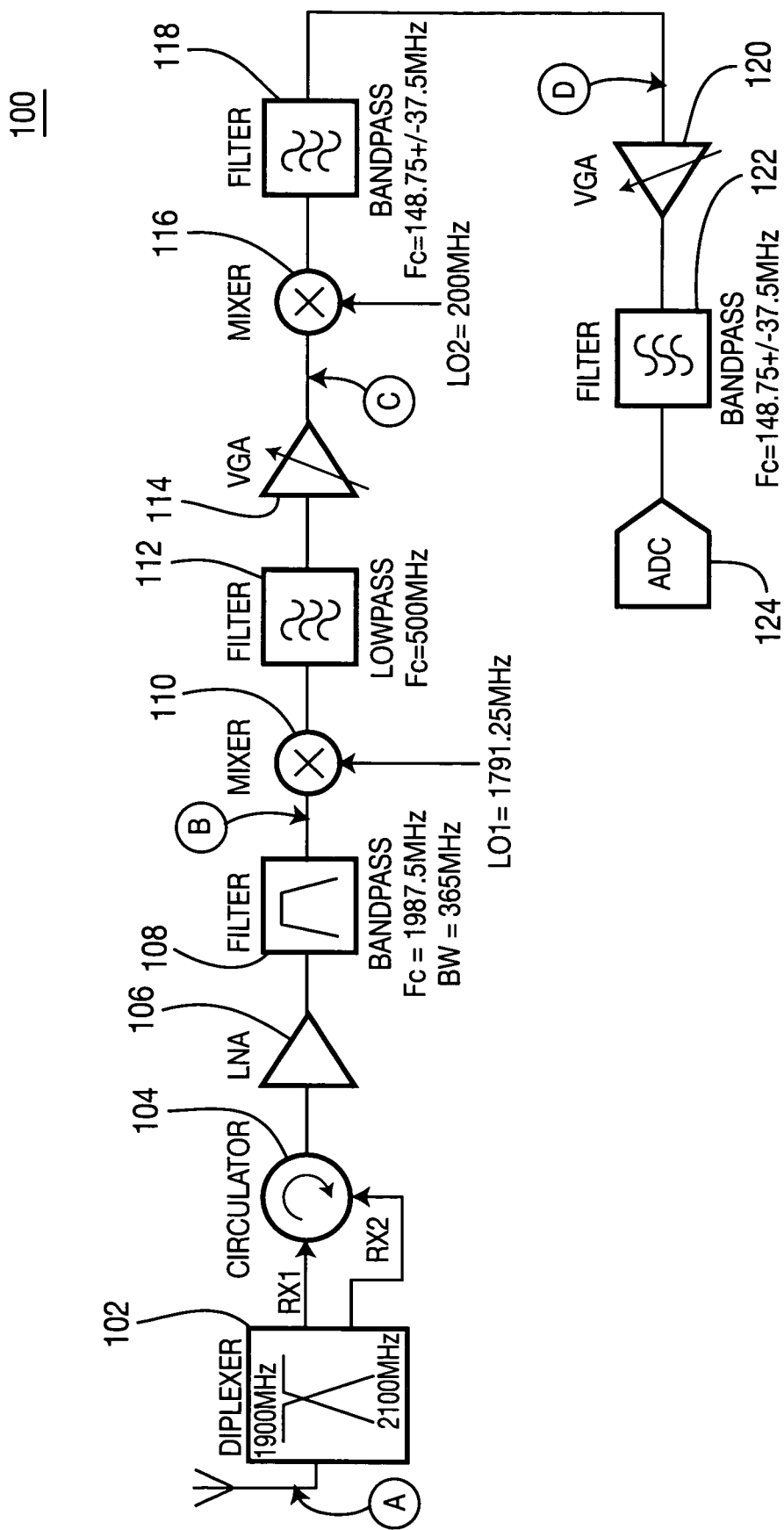
FIG. 1 is a block diagram of a receiver in accordance with a first embodiment of the present invention.

The features of the present invention may be incorporated into an integrated circuit (IC) or be configured in a circuit comprising a multitude of interconnecting components.

The present invention provides a method and apparatus for use in supporting simultaneous reception of multiple wireless communication services in a single receiver chain. The hardware can be configured by software. Hereinafter, the present invention will be explained with reference to DCS and WCDMA frequency division duplex (FDD) as examples of simultaneous services. However, it should be noted that the present invention is applicable to any other services and any number of simultaneous services. The numerical values shown in the drawings are provided as an example, not a limitation, and any other numerical values may be implemented without departing from the teachings of the present invention.

Figure 2A:
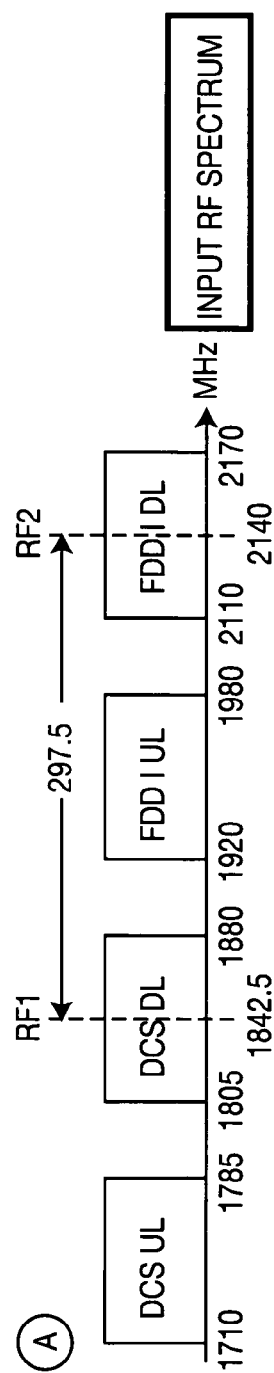
FIGS. 2A-2D are diagrams of signal spectrum at each stage in the receiver of FIG. 1.

FIG. 1 is a block diagram of a receiver 100 in accordance with a first embodiment of the present invention. FIGS. 2A-2D are diagrams of signal spectrum at each stage in the receiver 100 of FIG. 1. A diplexer 102 and a circulator 104 band-limit the input spectrum, which is shown in FIG. 2A, and combine the desired service downlink bands, while minimizing component loss before a low noise amplifier (LNA) 106. This also establishes the system noise figure which primarily comprises the noise figure of the LNA 106 plus any loss before the LNA 106, as long as the LNA 106 has sufficient gain (10-15 dB) to minimize the second stage noise figure contributions from the rest of the receiver chain. The diplexer 102 removes any intermediate uplink bands, (such as FDD uplink band in FIG. 2A), that fall between the desired downlink bands and therefore prevents saturation of the wideband LNA 106. Arbitrary channels in two full receive bands can be simultaneously received and the service selection is software configurable.

Figure 2B:
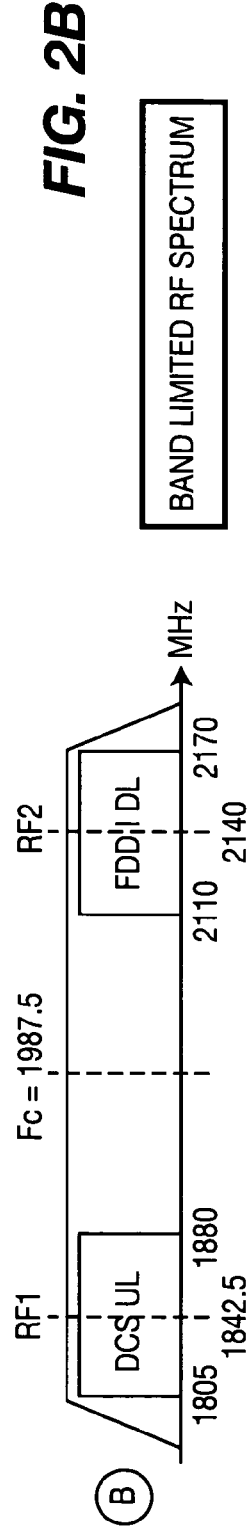
Figure 2C:
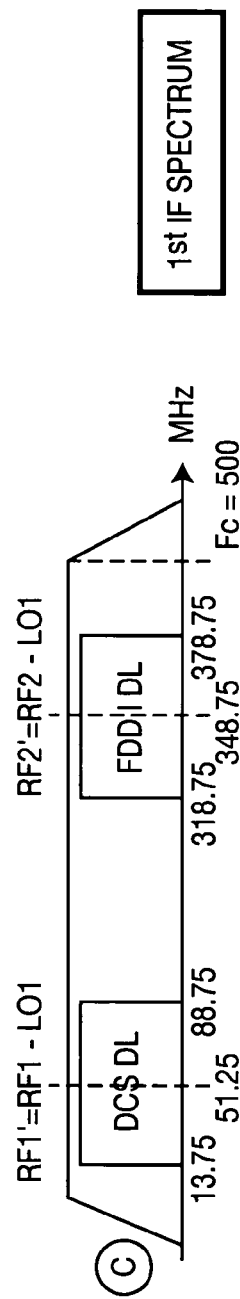

The band-limited input spectrum is amplified by the LNA 106 and filtered by a first filter 108. The input spectrum after being filtered by the first filter 108 is shown in FIG. 2B. The band-limited input signal is down-converted to a first IF bandwidth by a mixer 110 with a fixed LO1 frequency. The first IF is filtered again by a second filter 112 to remove image frequencies and blockers; and then amplified by a variable gain amplifier (VGA) 114. The first IF spectrum as output by the VGA 114 is shown in FIG. 2C.

Figure 2D:
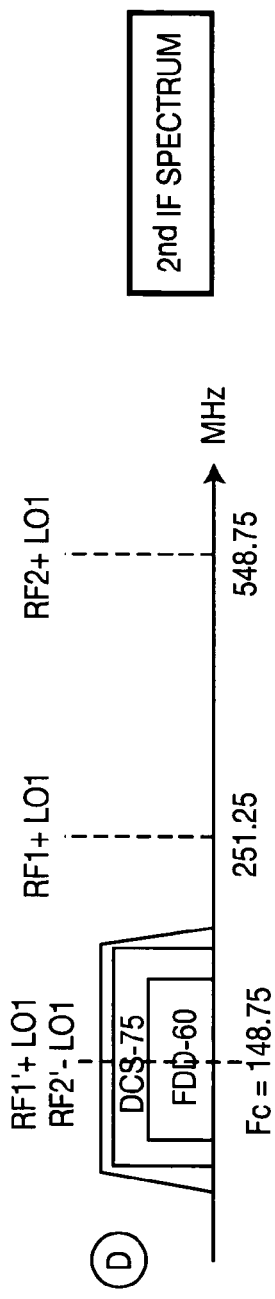

Using image frequency translations, a second down-conversion is conducted by a mixer 116 with LO2. The second IF spectrum is shown in FIG. 2D. LO2 frequency is set such that the second down-conversion causes the multiple service downlink bands to be folded into a single second IF bandwidth as shown in FIG. 2D. The DCS downlink band and the WCDMA FDD downlink band are folded in a single second IF bandwidth. This allows the use of high Q filters to attenuate out-of-band blockers and jammers at the second IF bandwidth. Multiple LO frequencies can also be used to place the downlink bands of multiple services anywhere within a defined second IF bandwidth.

The receiver 100 of FIG. 1 performs two down-conversions. However, it should be noted that the configuration of the receiver 100 in FIG. 1, and other embodiments of the present invention which will be explained later, are merely preferable embodiments of the present invention, and one or more than two down-conversions may be implemented. The local oscillators, LO1 and LO2, are set using an adaptive frequency plan with fixed filters to fold the receive downlink bands to a second IF while minimizing the second IF bandwidth.

The final IF signals are further down sampled by an analog-to-digital converter (ADC) 124 after being processed by filters 118, 122 and a VGA 120. By minimizing the second IF bandwidth, the sampling frequency of the ADC 124 can be adaptive, thus minimizing power consumption of the final digital down conversion to baseband.

The final IF bandwidth is dependent on the receiver's signal-to-noise and distortion ratio (SINAD) measurement. The SINAD measurement includes the distortion products that are within the receiver's processing bandwidth. Normally only one signal is present within this bandwidth and distortion products are not generated, so only a signal-to-noise ratio (SNR) measurement is required. Since there are multiple signals present in the receiver, distortion products are generated within the processing band and these levels need to be accounted for in the SNR measurement. In accordance with the present invention, the minimum bandwidth is selected when the highest SINAD is measured, and conversely the largest final bandwidth is selected when the lowest SINAD is measured.

Figure 3:
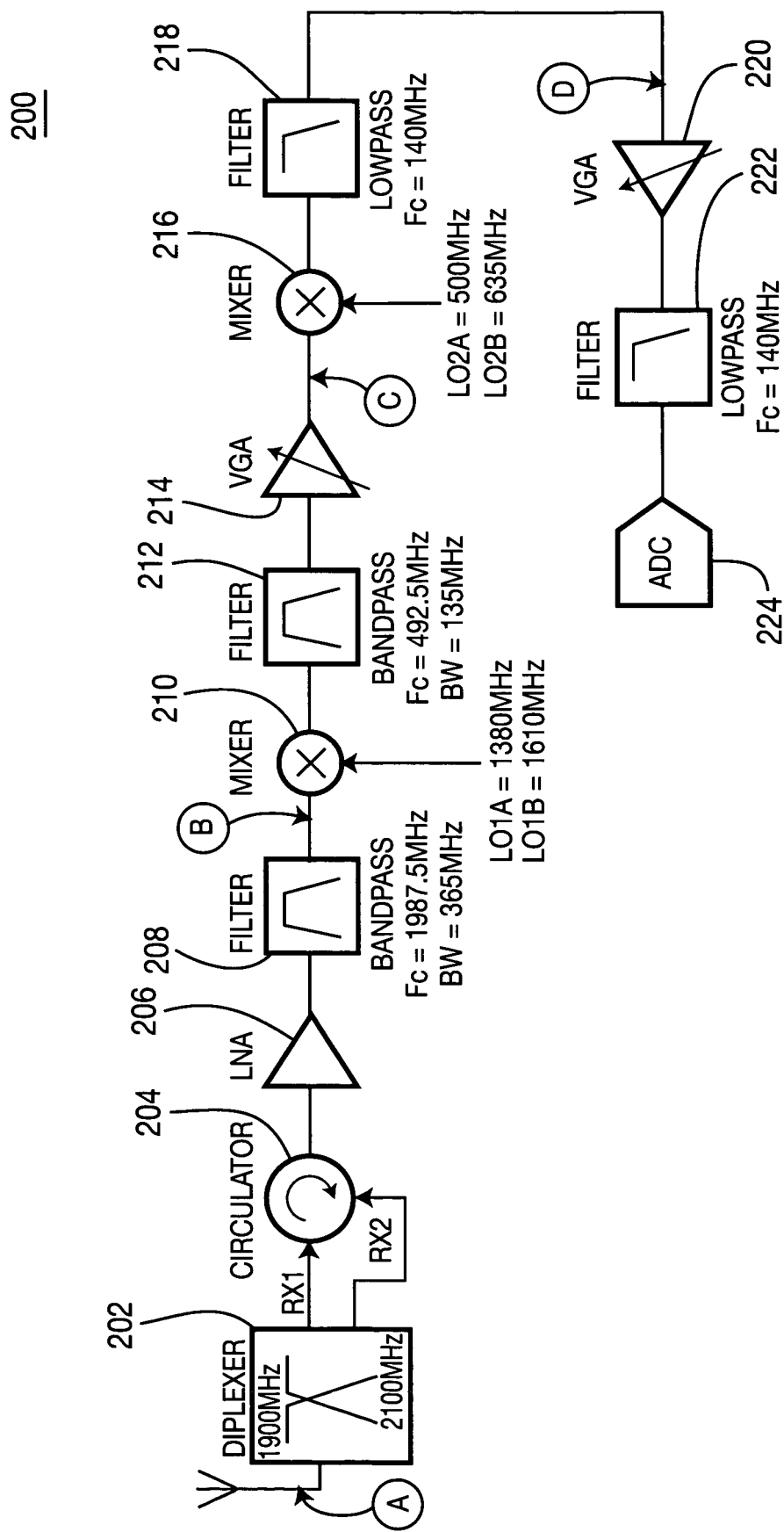
FIG. 3 is a block diagram of a receiver in accordance with a second embodiment of the present invention.
Figure 4:
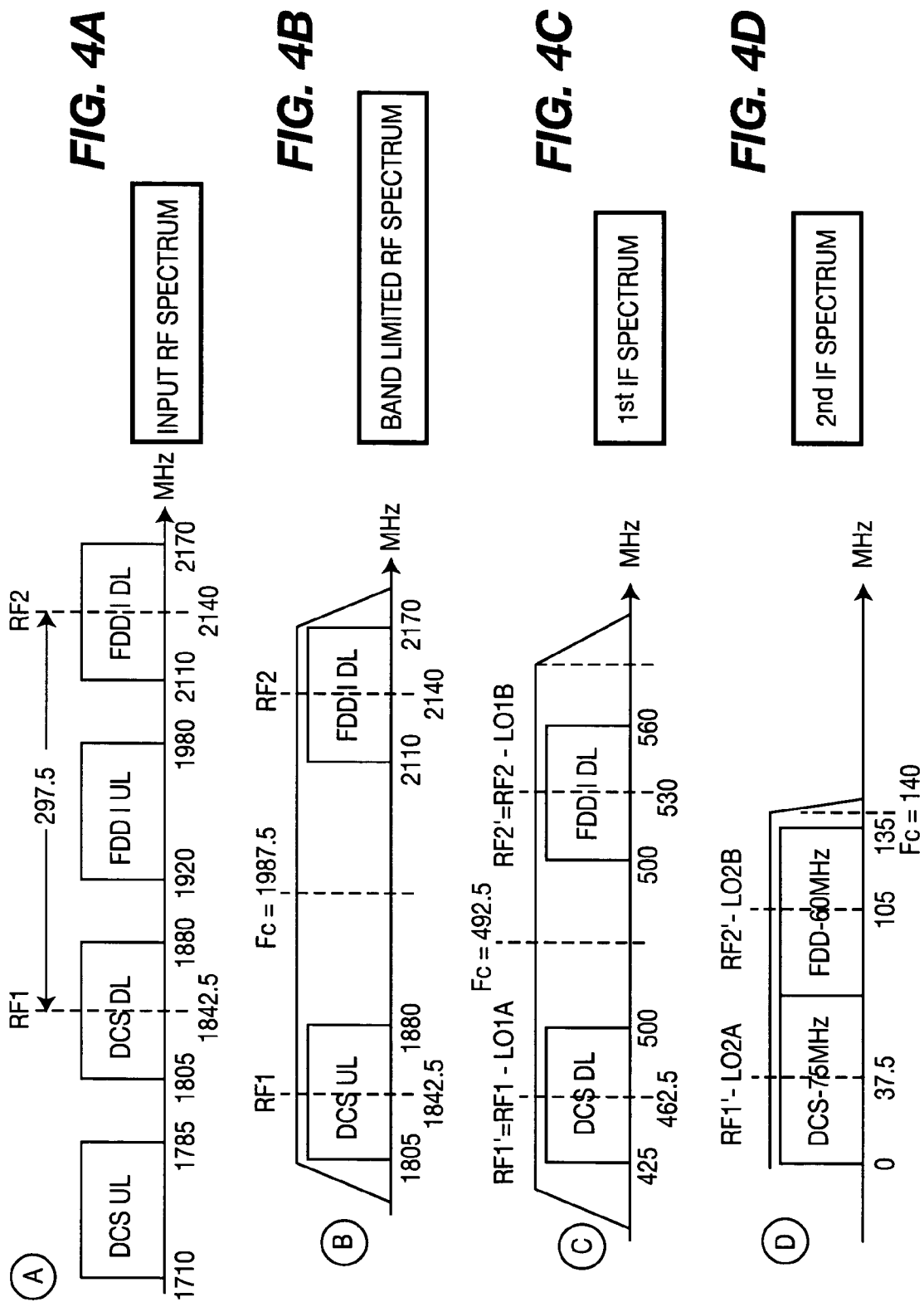
FIGS. 4A-4D are diagrams of signal spectrum at each stage in the receiver of FIG. 3.

FIG. 3 is a block diagram of a receiver 200 in accordance with a second embodiment of the present invention. FIGS. 4A-4D are diagrams of signal spectrum at each stage in the receiver of FIG. 3. A diplexer 202 and a circulator 204 band-limit the input spectrum, which is shown in FIG. 4A. The band-limited input spectrum is amplified by a LNA 206 and filtered by a first filter 208. The input spectrum after being filtered by the first filter 208 is shown in FIG. 4B.

The input signals are then down-converted to IF signals by mixing the input signals with signals generated by a LO1. In the second embodiment, the two-downlink bands are converted to adjacent bands at the final IF using two fixed LO1 frequencies and two fixed LO2 frequencies. The input signals of each service is down-converted using different LO frequencies. In this example, the DCS downlink band is down-converted with LO1A and LO2A frequencies, and the WCDMA FDD downlink band is down-converted with LO1B and LO2B frequencies.

The band-limited input signal of each service is down-converted to a first IF bandwidth by a mixer 210 with LO1A and LO1B frequencies, respectively, and filtered again by a second filter 212 to remove image frequencies and blockers and amplified by a VGA 214. The first IF spectrum as output by the VGA 214 is shown in FIG. 4C.

A second down-conversion is conducted by a mixer 216 with LO2A and LO2B, respectively. The second IF spectrum as output by a filter 218 is shown in FIG. 4D. LO1A, LO1B, LO2A and LO2B frequencies are set such that the second down-conversion causes the multiple service downlink bands to be located adjacent each other in the second IF bandwidth as shown in FIG. 4D. In this example, the DSC downlink band and the WCDMA FDD downlink band are converted to adjacent bands in the final IF band. Multiple LO frequencies can also be used to place the downlink bands of multiple services anywhere within a defined second IF bandwidth. The final intermediate frequency is further down sampled by an ADC 224 after being processed by filters 218, 222 and the VGA 220. By minimizing the second IF bandwidth, the sampling frequency of the ADC 224 can be adaptive, thus minimizing power consumption of the final digital down conversion to baseband.

Figure 5:
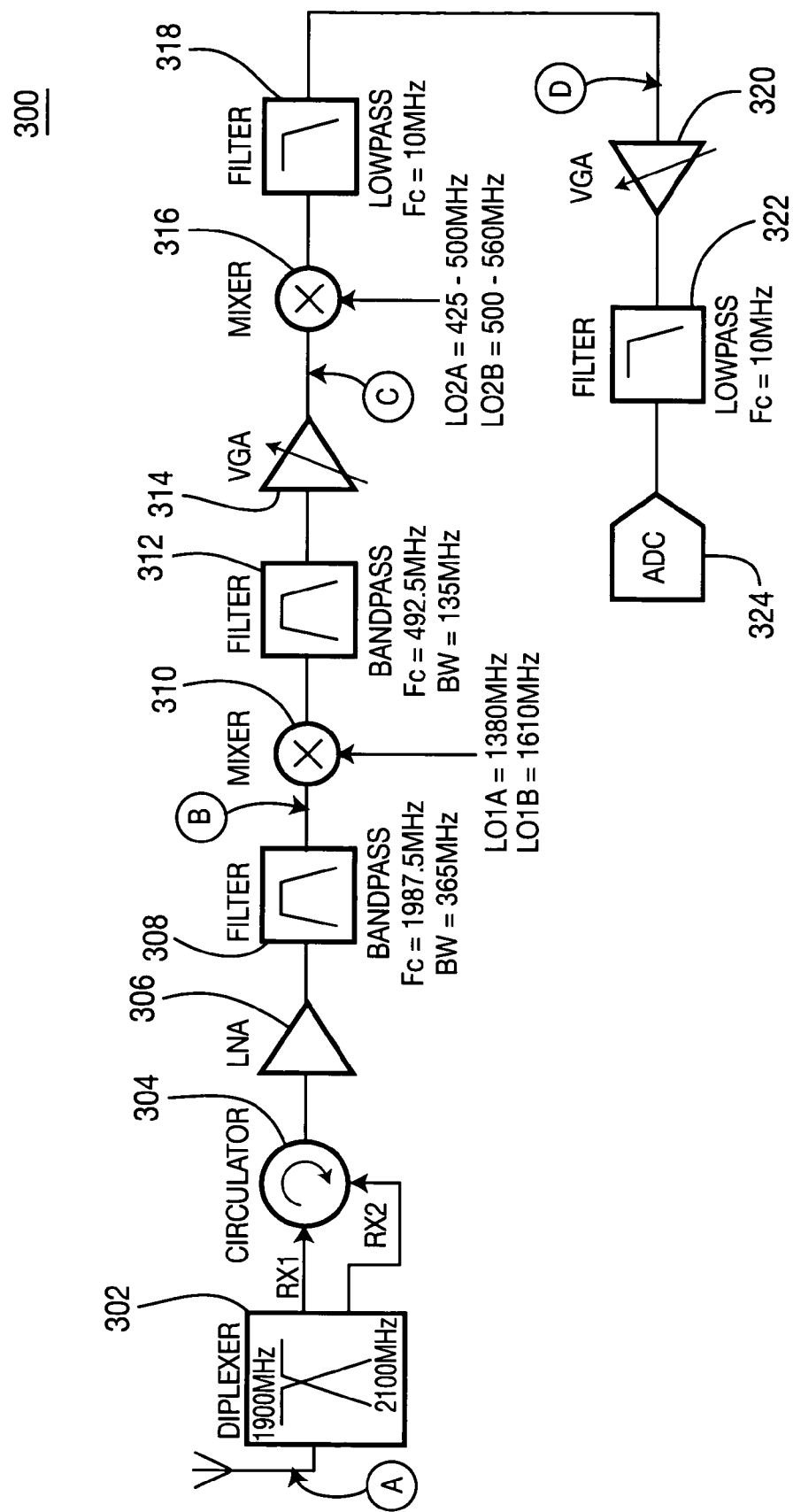
FIG. 5 is a block diagram of a receiver in accordance with a third embodiment of the present invention.
Figure 6:
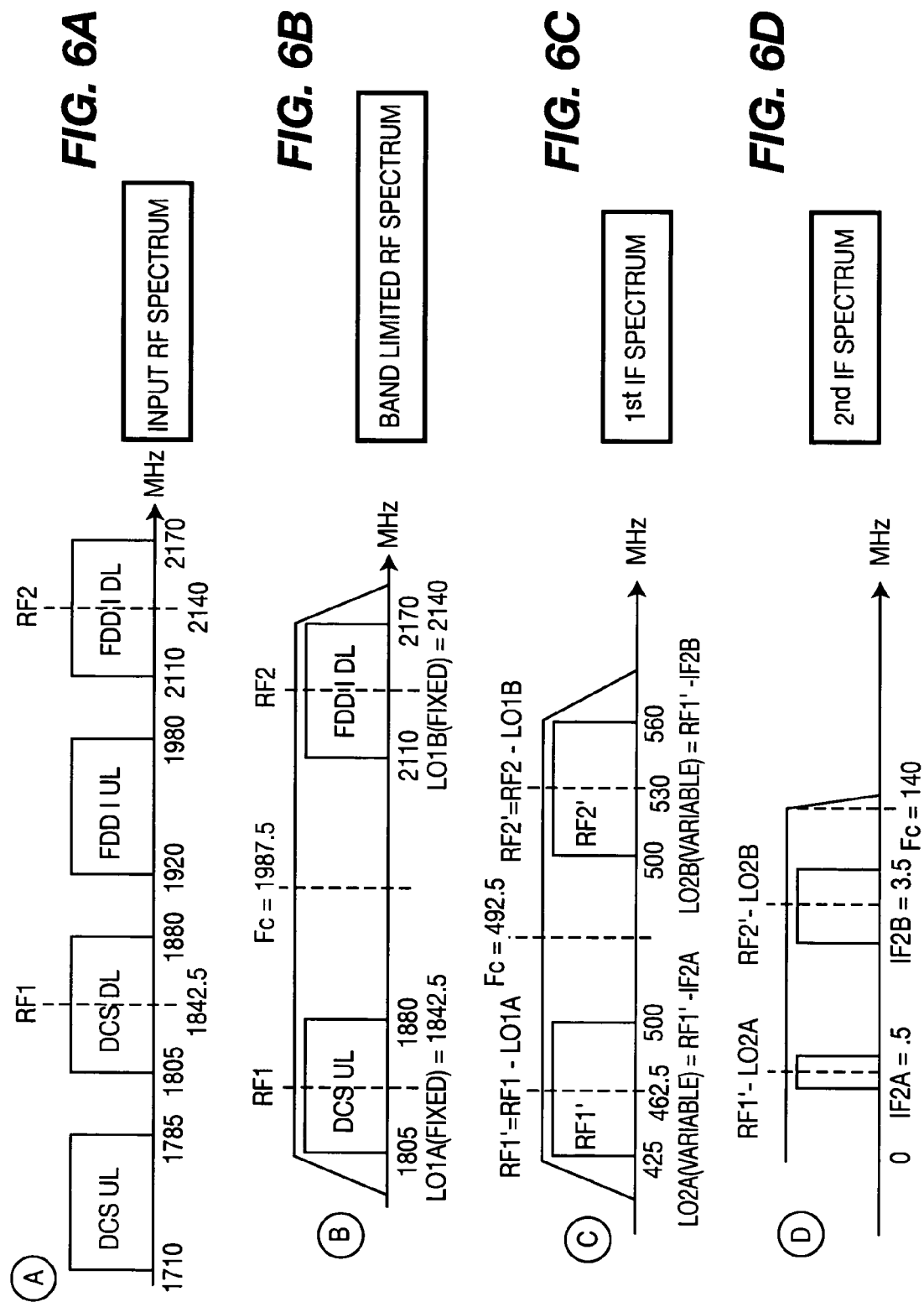
FIGS. 6A-6D are diagrams of signal spectrum at each stage in the receiver of FIG. 5.

FIG. 5 is a block diagram of a receiver 300 in accordance with a third embodiment of the present invention. FIGS. 6A-6D are diagrams of signal spectrum at each stage in the receiver 300 of FIG. 5. A diplexer 302 and a circulator 304 band-limit the input spectrum, which is shown in FIG. 6A. The band-limited input spectrum is amplified by a LNA 306 and filtered by a first filter 308. The input spectrum after being filtered by the first filter 308 is shown in FIG. 6B.

The band-limited input signal of each service is down-converted to a first IF bandwidth by a mixer 310 with LO1A and LO1B frequencies, respectively, and filtered again by a second filter 312 to remove image frequencies and blockers; and amplified by a VGA 314. The first IF spectrum as output by the VGA 314 is shown in FIG. 6C.

In the third embodiment, any arbitrary channels from the downlink bands can be down-converted to arbitrarily spaced channels at IF band by using a configurable LO2. A second down-conversion of the two input signals is conducted by a mixer 316 with LO2A and LO2B, respectively. The second IF spectrum after being filtered by a filter 318 is shown in FIG. 6D. LO2A and LO2B frequencies are adjustable so that the second down-conversion causes the multi-service downlink bands to be located in the second IF bandwidth separated from each other as shown in FIG. 6D.

As an alternative, LO1A and LO2A may be adjustable and LO2A and LO2B may be fixed, or both LOs may be adjustable. Multiple LO frequencies can also be used to place the downlink bands of multiple services anywhere within a defined second IF bandwidth. The final intermediate frequency is further down sampled by an ADC 324 after being processed by filters 318, 322 and the VGA 320. By minimizing the second IF bandwidth, the sampling frequency of the ADC 324 can be adaptive, thus minimizing power consumption of the final digital down conversion to baseband.

Figure 7:
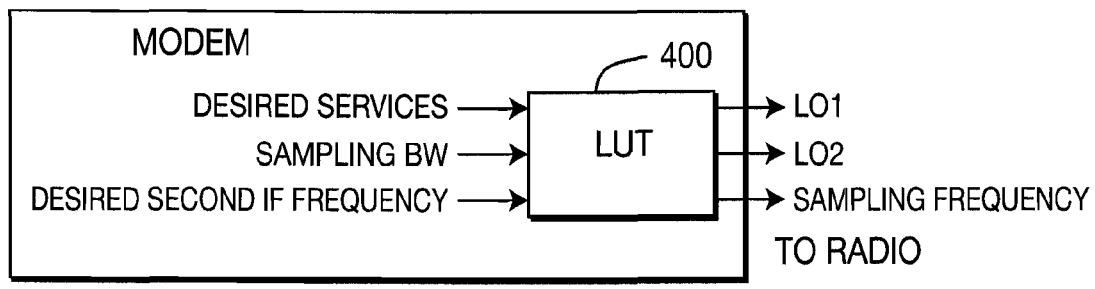
FIG. 7 is a block diagram of a look-up table (LUT) used to implement adaptive frequency down-conversions in accordance with the present invention.

FIG. 7 is a block diagram of a look-up table (LUT) 400 in the modem of the receiver used to implement adaptive frequency down-conversions in accordance with the present invention. The desired services, sampling bandwidth and desired second IF are used as inputs to the LUT 400, and the LUT 400 outputs the LO1 and LO2 frequency settings and the ADC sampling frequency. The LUT 400 optimizes the frequency plan, sample frequency and sampling bandwidth according to the available services and the SINAD measurements. The LUT may be utilized in any embodiments of the present invention.

Figure 8:
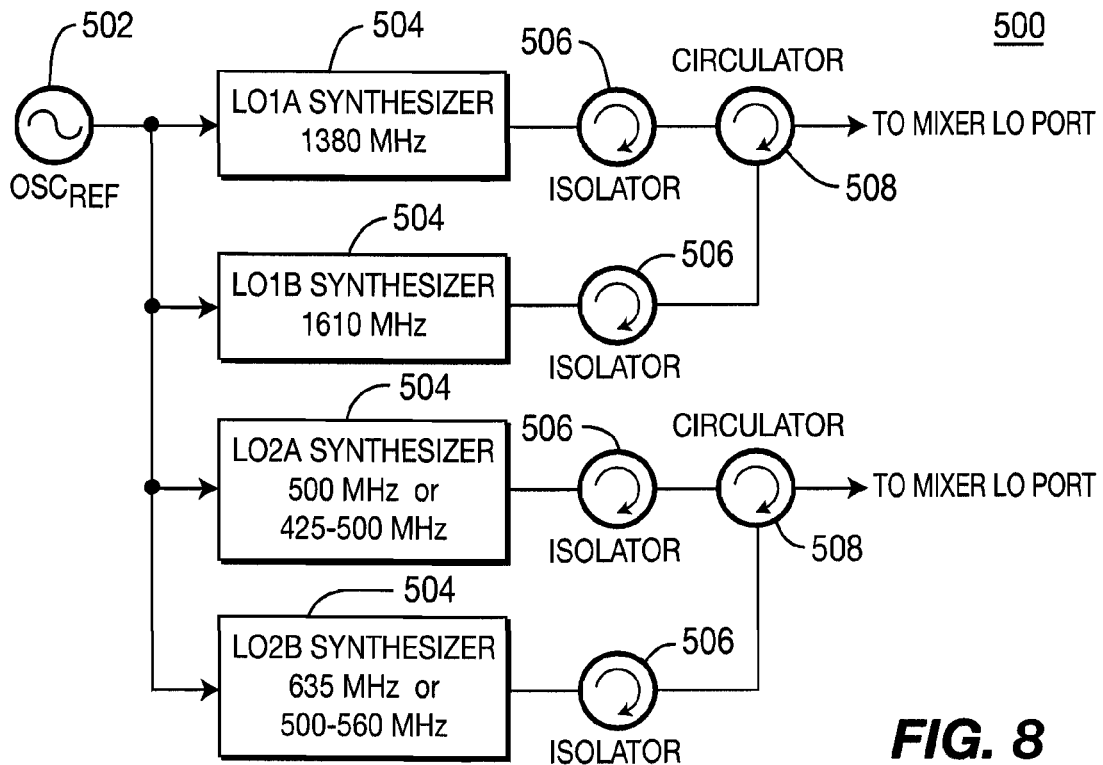
FIG. 8 is a block diagram for synthesizing frequencies for local oscillators in accordance with the present invention.

FIG. 8 is a block diagram of a LO frequency synthesizer 500 for synthesizing frequencies for local oscillators in accordance with the present invention. Since the receivers shown in the second and third embodiments require multiple LO frequencies, the synthesizer 500 must be able to generate these frequencies. The LO frequency synthesizer 500 comprises a reference oscillator 502 and one or more synthesizers 504. The LO frequency synthesizer may optionally further comprise one or more isolators 506 and one or more circulators 508. The reference oscillator 502 generates the reference frequency which is input into the plurality of synthesizers 504. Each synthesizer 504 is tuned to generate IF frequencies in accordance with the LO1 and LO2 frequency settings generated by the LUT 400. The IF frequencies generated by the synthesizers 504 are sent to a LO port of a mixer to down-convert the input signals.

A circulator 508 is preferably used to combine the two synthesizers' LO frequencies in a low loss combining scheme that will minimize synthesizer power consumption. Isolators 506 are provided at the output of each synthesizer 504 to provide sufficient reverse isolation to eliminate frequency pulling in either synthesizer due to the other synthesizer. Alternatively, buffer amplifiers in the synthesizers 504 may be used to provide isolation. This allows the synthesizer approach to be further simplified by removing the isolators 506.

Figure 9:
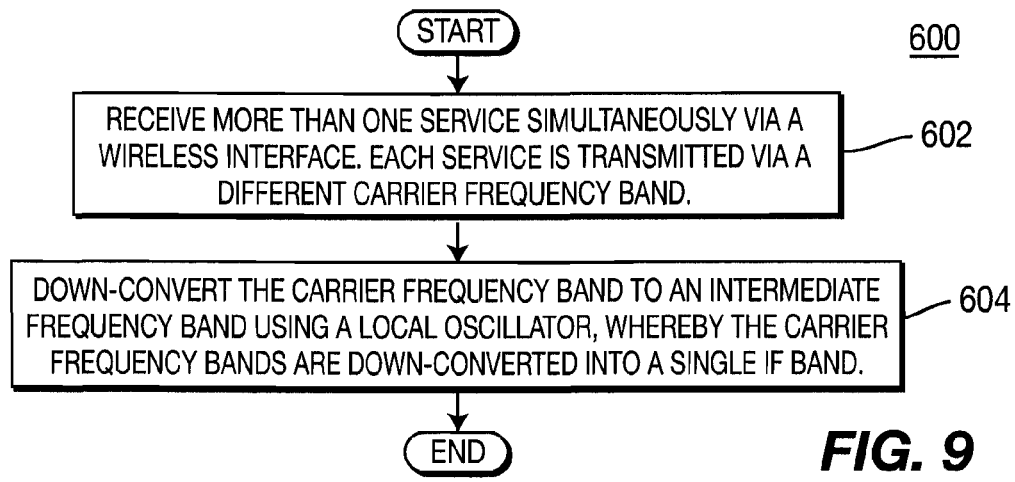
FIG. 9 is a flow diagram of a process for simultaneously processing multiple wireless communication services in a receiver in accordance with the present invention.

FIG. 9 is a flow diagram of a process 600 for simultaneously processing multiple wireless communication services in a receiver in accordance with the present invention. More than one service is received simultaneously via a wireless interface (step 602). Each service is transmitted via a different carrier frequency band. The received carrier frequency bands are down-converted to IF bands using a local oscillator (LO) such that the down-converted frequency bands fall into a single IF band (step 604).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A receiver, comprising:
   a wireless interface configured to receive a radio frequency signal including a plurality of wireless services having different radio frequencies and frequency bandwidths;
   a diplexer and circulator configured to band-limit the received radio frequency signal to include a first downlink frequency bandwidth of a first wireless service of the plurality of wireless services and a second downlink frequency bandwidth of a second wireless service of the plurality of wireless services;
   the diplexer further configured to remove uplink frequency bandwidths between the first downlink frequency bandwidth and the second downlink frequency bandwidth of the band-limited radio frequency signal;
   a first mixer configured to down convert the band-limited radio frequency signal, in a single stage using a first single down converting frequency, to a first single intermediate frequency signal, wherein the first single intermediate frequency signal includes a first intermediate frequency signal of the first downlink frequency bandwidth and a first intermediate frequency signal of the second downlink frequency bandwidth, wherein the first intermediate frequency signal of the first downlink frequency bandwidth and the first intermediate signal of the second downlink frequency bandwidth are different;
   a second mixer configured to down convert the first single intermediate frequency signal, in a single stage using a second single down converting frequency, to a second intermediate frequency signal, wherein the second intermediate frequency signal includes a second intermediate frequency signal of the first downlink frequency bandwidth and a second intermediate frequency signal of the second downlink frequency bandwidth, wherein the second intermediate frequency signal of the first downlink frequency bandwidth and the second intermediate frequency signal of the second downlink frequency bandwidth are substantially the same; and
   an analog-to-digital converter configured to recover data from the second intermediate frequency signal.

2. The receiver of claim 1, wherein the receiver is software configurable.

3. The receiver of claim 1, wherein one of the plurality of wireless services having different radio frequencies and frequency bandwidths is wideband code division multiple access.

4. A method for use in a receiving device, comprising:
   receiving a radio frequency signal, by the receiving device, the radio frequency signal including a plurality of wireless services having different radio frequencies and frequency bandwidths;
   band-limiting the received radio frequency signal to include a first downlink frequency bandwidth of a first wireless service of the plurality of wireless services and a second downlink frequency bandwidth of a second wireless service of the plurality of wireless services;
   removing uplink frequency bandwidths between the first downlink frequency bandwidth and the second downlink frequency bandwidth of the band-limited radio frequency signal;
   down converting the band-limited radio frequency signal, by the receiving device, in a single stage using a first single down converting frequency, to a first single intermediate frequency signal, wherein the first single intermediate frequency signal includes a first intermediate frequency signal of the first downlink frequency bandwidth and a first intermediate frequency signal of the second downlink frequency bandwidth, wherein the first intermediate frequency signal of the first downlink frequency bandwidth and the first intermediate signal of the second downlink frequency bandwidth are different;
   down converting the first single intermediate frequency signal, in a single stage using a second single down converting frequency, to a second intermediate frequency signal, wherein the second intermediate frequency signal includes a second intermediate frequency signal of the first downlink frequency bandwidth and a second intermediate frequency signal of the second downlink frequency bandwidth, wherein the second intermediate frequency signal of the first downlink frequency bandwidth and the second intermediate frequency signal of the second downlink frequency bandwidth are substantially the same; and
   recovering data from the second intermediate frequency signal, by the receiving device, using an analog to digital converter.

5. The method of claim 4, wherein the receiving device is software configurable.

6. The method of claim 4, wherein one of the plurality of wireless services having different radio frequencies and frequency bandwidths is wideband code division multiple access.

* * * * *